(12) United States Patent
Thomas et al.

(10) Patent No.: US 12,459,053 B2
(45) Date of Patent: *Nov. 4, 2025

(54) COATING ABLATING APPARATUS WITH COATING REMOVAL DETECTION

(71) Applicant: General Lasertronics Corporation, San Jose, CA (US)

(72) Inventors: James W. Thomas, Los Altos, CA (US); Raymond J. Noel, San Francisco, CA (US); Mitchell R. Wool, Sunnyvale, CA (US)

(73) Assignee: General Lasertronics Corporation, San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/513,126

(22) Filed: Nov. 17, 2023

(65) Prior Publication Data

US 2024/0082947 A1 Mar. 14, 2024

Related U.S. Application Data

(60) Continuation of application No. 17/351,908, filed on Jun. 18, 2021, now Pat. No. 11,819,939, which is a
(Continued)

(51) Int. Cl.
 *B23K 26/03* (2006.01)
 *B23K 26/361* (2014.01)
(52) U.S. Cl.
 CPC .......... *B23K 26/032* (2013.01); *B23K 26/361* (2015.10)
(58) Field of Classification Search
 CPC ............................ B23K 26/361; B23K 26/032
(Continued)

(56) References Cited

U.S. PATENT DOCUMENTS 3,624,553 A 11/1971 Van-Tran
3,626,141 A 12/1971 Daly
(Continued)

FOREIGN PATENT DOCUMENTS

DE 19715702 A1 10/1998
EP 91646 9/2008
(Continued)

OTHER PUBLICATIONS

"Photonic Cleaning Process Moves to Heavy Industry, " Mar. 1997, p. 22, Photonics Spectra.
(Continued)

*Primary Examiner* — Jimmy Chou
(74) *Attorney, Agent, or Firm* — Haverstock & Owens, A Law Corporation

(57) ABSTRACT

A laser-based coating removal apparatus to remove a coating from a surface without damaging the surface. The apparatus comprises a laser source to provide a laser light, a routing element coupled to the laser source and configured to direct the laser light onto a target region of the surface thereby removing the coating from the target region, and a detection element to detect the coating as the coating separates from the target region of the surface. The detection element is able to prevent the surface from being damaged by limiting or eliminating the laser light directed onto the target region after all the coating has been removed. The detection element is able to detect the separation of the coating from the target region by detecting incandescence, acoustic signature, motion, fluorescence and/or chemical properties produced by the separation of the coating from the surface.

24 Claims, 3 Drawing Sheets

Related U.S. Application Data division of application No. 16/123,210, filed on Sep. 6, 2018, now Pat. No. 11,045,900, which is a continuation of application No. 13/177,431, filed on Jul. 6, 2011, now Pat. No. 10,112,257.

(60) Provisional application No. 61/362,976, filed on Jul. 9, 2010.

(58) Field of Classification Search
USPC .................................................. 219/121.69
See application file for complete search history.

(56) References Cited

U.S. PATENT DOCUMENTS

| | | | | |
|---|---|---|---|---|
| 3,657,707 | A | 4/1972 | McFarland et al. | |
| 3,771,880 | A | 11/1973 | Bennett | |
| 3,843,865 | A | 10/1974 | Nath | |
| 3,941,973 | A | 3/1976 | Luck, Jr. et al. | |
| 4,052,523 | A * | 10/1977 | Rhodes | B32B 7/12 428/116 |
| 4,114,018 | A * | 9/1978 | Von Allmen | H01S 3/0057 219/121.62 |
| 4,136,779 | A | 1/1979 | Bieringer | |
| 4,148,057 | A | 4/1979 | Jesse | |
| 4,207,874 | A | 6/1980 | Choy | |
| 4,328,068 | A * | 5/1982 | Curtis | H01J 37/32935 216/60 |
| 4,398,790 | A | 8/1983 | Righini et al. | |
| 4,421,201 | A * | 12/1983 | Nelsen | F02C 7/045 428/116 |
| 4,449,043 | A | 5/1984 | Husbands | |
| 4,504,727 | A * | 3/1985 | Melcher | B23K 26/705 219/121.62 |
| 4,521,070 | A | 6/1985 | Scottini et al. | |
| 4,539,244 | A * | 9/1985 | Beggs | B32B 3/12 428/116 |
| 4,543,477 | A | 9/1985 | Doi et al. | |
| 4,564,736 | A | 1/1986 | Jones et al. | |
| 4,566,937 | A | 1/1986 | Pitts | |
| 4,584,455 | A | 4/1986 | Tomizawa | |
| 4,588,885 | A * | 5/1986 | Lovoi | B08B 7/0042 134/1 |
| 4,600,619 | A * | 7/1986 | Chee | B32B 5/24 156/173 |
| 4,644,948 | A * | 2/1987 | Lang | A61F 9/00821 606/4 |
| 4,654,532 | A | 3/1987 | Hirschfeld | |
| 4,665,377 | A | 5/1987 | Harpainter | |
| 4,671,848 | A | 6/1987 | Miller et al. | |
| 4,676,586 | A | 6/1987 | Jones et al. | |
| 4,687,918 | A | 8/1987 | Hughes et al. | |
| 4,695,698 | A | 9/1987 | Mayor et al. | |
| 4,707,073 | A | 11/1987 | Kocher | |
| 4,725,485 | A * | 2/1988 | Hirokawa | D03D 25/005 442/205 |
| 4,729,621 | A | 3/1988 | Edelman | |
| 4,737,004 | A | 4/1988 | Amitay et al. | |
| 4,737,628 | A * | 4/1988 | Lovoi | B08B 7/0042 606/7 |
| 4,749,840 | A | 6/1988 | Piwczyk | |
| 4,756,756 | A | 7/1988 | Woodroffe | |
| 4,762,385 | A | 8/1988 | Fuse | |
| 4,799,755 | A | 1/1989 | Jones | |
| 4,807,954 | A | 2/1989 | Oyamada et al. | |
| 4,818,049 | A | 4/1989 | Assenheim et al. | |
| 4,818,062 | A | 4/1989 | Schifres et al. | |
| 4,821,943 | A | 4/1989 | Gaudin et al. | |
| 4,833,029 | A * | 5/1989 | DuPont | B32B 3/12 428/116 |
| 4,842,360 | A | 6/1989 | Caro et al. | |
| 4,844,574 | A | 7/1989 | Chande | |
| 4,844,947 | A | 7/1989 | Kanser et al. | |
| 4,859,075 | A | 8/1989 | Sutter, Jr. et al. | |
| 4,876,444 | A | 10/1989 | Field | |
| 4,880,959 | A | 11/1989 | Baum et al. | |
| 4,900,891 | A | 2/1990 | Vega et al. | |
| 4,920,994 | A | 5/1990 | Nachbar | |
| 4,921,751 | A * | 5/1990 | Wakahara | D02G 1/18 442/310 |
| 4,928,695 | A | 5/1990 | Goldman et al. | |
| 4,931,616 | A | 6/1990 | Usui et al. | |
| 4,960,988 | A | 10/1990 | Simms | |
| 4,986,664 | A | 1/1991 | Lovoi | |
| 4,994,567 | A | 2/1991 | Crisp et al. | |
| 4,994,639 | A | 2/1991 | Dickinson | |
| 5,006,268 | A | 4/1991 | Griffaton | |
| 5,014,207 | A * | 5/1991 | Lawton | G09B 25/00 427/512 |
| 5,040,479 | A | 8/1991 | Thrash | |
| 5,068,750 | A | 11/1991 | Cook et al. | |
| RE33,777 | E | 12/1991 | Woodroffe | |
| 5,081,350 | A | 1/1992 | Iwasaki et al. | |
| 5,107,445 | A | 4/1992 | Jensen et al. | |
| 5,113,802 | A | 5/1992 | Le Blanc | |
| 5,151,134 | A | 9/1992 | Boquillion et al. | |
| 5,194,723 | A * | 3/1993 | Cates | G01N 29/2418 219/121.62 |
| 5,204,517 | A * | 4/1993 | Cates | B44D 3/166 134/1 |
| 5,210,944 | A | 5/1993 | Monson et al. | |
| 5,216,808 | A | 6/1993 | Martus et al. | |
| 5,229,593 | A | 7/1993 | Cato | |
| 5,240,533 | A * | 8/1993 | Bottger | D06N 3/0022 442/205 |
| 5,245,682 | A | 9/1993 | Ortiz et al. | |
| 5,281,798 | A * | 1/1994 | Hamm | B23K 26/40 250/226 |
| 5,291,570 | A | 3/1994 | Filgas et al. | |
| 5,293,023 | A | 3/1994 | Haruta et al. | |
| 5,328,517 | A * | 7/1994 | Cates | B24C 1/003 134/1 |
| 5,333,218 | A | 7/1994 | Ortiz et al. | |
| 5,355,063 | A | 10/1994 | Boone et al. | |
| 5,364,390 | A | 11/1994 | Taboada et al. | |
| 5,371,582 | A | 12/1994 | Toba et al. | |
| 5,373,140 | A | 12/1994 | Nagy et al. | |
| 5,386,112 | A | 1/1995 | Dixon | |
| 5,387,455 | A * | 2/1995 | Horsch | E04C 2/16 139/420 C |
| 5,395,362 | A | 3/1995 | Sacharoff et al. | |
| 5,446,256 | A | 8/1995 | Cartry | |
| 5,451,765 | A | 9/1995 | Gerber | |
| 5,526,167 | A | 6/1996 | Peng | |
| 5,531,857 | A | 7/1996 | Engelsberg et al. | |
| 5,548,113 | A * | 8/1996 | Goldberg | G01Q 60/22 359/368 |
| 5,558,666 | A | 9/1996 | Dewey et al. | |
| 5,562,840 | A * | 10/1996 | Swain | B23K 26/361 216/75 |
| 5,571,335 | A * | 11/1996 | Lloyd | B08B 7/02 451/39 |
| 5,581,346 | A | 12/1996 | Sopori | |
| 5,589,089 | A | 12/1996 | Usegi | |
| 5,592,879 | A | 1/1997 | Waizmann | |
| 5,593,808 | A | 1/1997 | Ellis | |
| 5,610,753 | A | 3/1997 | Kessler et al. | |
| 5,613,509 | A * | 3/1997 | Kolb | B44D 3/166 134/1 |
| 5,622,540 | A * | 4/1997 | Stevens | C03B 33/091 219/121.6 |
| 5,637,245 | A | 6/1997 | Shelton | |
| 5,643,476 | A | 7/1997 | Garmine et al. | |
| 5,656,186 | A | 8/1997 | Mourou et al. | |
| 5,662,762 | A | 9/1997 | Ranalli | |
| 5,720,894 | A | 2/1998 | Neev | |
| 5,767,479 | A * | 6/1998 | Kanaoka | B23K 26/60 219/121.72 |
| 5,780,806 | A | 7/1998 | Ferguson et al. | |
| 5,782,253 | A * | 7/1998 | Cates | B24C 1/003 134/201 |
| 5,784,162 | A | 7/1998 | Cabib et al. | |

(56) References Cited

U.S. PATENT DOCUMENTS

| | | | |
|---|---|---|---|
| 5,789,755 A * | 8/1998 | Bender | B44D 3/168 |
| | | | 134/1 |
| 5,790,046 A * | 8/1998 | Blossfeld | G01D 18/008 |
| | | | 324/207.13 |
| 5,805,275 A | 9/1998 | Taylor | |
| 5,845,646 A | 12/1998 | Lemelson | |
| 5,864,114 A * | 1/1999 | Fukuda | B23K 26/032 |
| | | | 219/121.69 |
| 5,889,253 A * | 3/1999 | Kanaoka | B23K 26/60 |
| | | | 219/121.72 |
| 5,954,712 A * | 9/1999 | Goodman | A61B 18/20 |
| | | | 606/12 |
| 5,954,974 A | 9/1999 | Broer | |
| 5,986,234 A * | 11/1999 | Matthews | B23K 26/1476 |
| | | | 219/121.68 |
| 6,040,549 A * | 3/2000 | Kanaoka | B23K 26/40 |
| | | | 219/121.72 |
| 6,040,553 A | 3/2000 | Ross | |
| 6,067,306 A * | 5/2000 | Sandstrom | G03F 7/70358 |
| | | | 372/38.01 |
| 6,165,170 A | 12/2000 | Wynne et al. | |
| 6,210,773 B1 * | 4/2001 | Moore | B32B 5/26 |
| | | | 428/116 |
| 6,215,094 B1 * | 4/2001 | Dausinger | B23K 26/40 |
| | | | 219/121.62 |
| 6,285,002 B1 * | 9/2001 | Ngoi | G03F 7/202 |
| | | | 219/121.73 |
| 6,288,362 B1 | 9/2001 | Thomas et al. | |
| 6,313,435 B1 * | 11/2001 | Shoemaker | B23K 26/389 |
| | | | 219/121.73 |
| 6,323,457 B1 * | 11/2001 | Jung | B23K 26/03 |
| | | | 219/121.62 |
| 6,347,976 B1 * | 2/2002 | Lawton | B44D 3/16 |
| | | | 451/6 |
| 6,383,177 B1 | 5/2002 | Balle-Peterson et al. | |
| 6,384,370 B1 * | 5/2002 | Tsunemi | B23K 26/0884 |
| | | | 219/121.69 |
| 6,414,263 B1 | 7/2002 | Uchida | |
| 6,437,285 B1 | 8/2002 | Thomas et al. | |
| 6,494,960 B1 | 12/2002 | Macdonald et al. | |
| 6,537,720 B1 | 3/2003 | Foley | |
| 6,608,438 B2 * | 8/2003 | Topelberg | H05B 33/26 |
| | | | 313/511 |
| 6,635,844 B2 | 10/2003 | Yu | |
| 6,664,499 B1 | 12/2003 | Brink et al. | |
| 6,693,255 B2 | 2/2004 | Freiwald | |
| 6,864,478 B2 | 3/2005 | Schroder | |
| 6,924,457 B2 | 8/2005 | Koyoma et al. | |
| 6,927,917 B2 | 8/2005 | Kiruma | |
| 7,009,141 B1 | 3/2006 | Wool et al. | |
| 7,055,781 B2 * | 6/2006 | Behrens | F28F 13/003 |
| | | | 244/159.3 |
| 7,062,177 B1 * | 6/2006 | Grivna | H04B 10/2581 |
| | | | 398/16 |
| 7,170,030 B2 | 1/2007 | Haight | |
| 7,265,033 B2 | 9/2007 | Shigematsu et al. | |
| 7,337,810 B2 * | 3/2008 | Orr | D03D 11/02 |
| | | | 139/423 |
| 7,381,383 B1 | 6/2008 | Yokoyama | |
| 7,397,014 B2 | 7/2008 | Hart et al. | |
| 7,407,591 B2 | 8/2008 | De Battisti et al. | |
| 7,408,130 B2 | 8/2008 | Sonoda et al. | |
| 7,429,470 B2 | 9/2008 | Lee et al. | |
| 7,452,476 B2 | 11/2008 | Bayer et al. | |
| 7,525,065 B2 | 4/2009 | Engler et al. | |
| 7,535,565 B1 | 5/2009 | Viertl et al. | |
| 7,632,420 B2 * | 12/2009 | Thomas | B08B 7/0042 |
| | | | 427/334 |
| 7,633,033 B2 * | 12/2009 | Thomas | B23K 26/082 |
| | | | 219/121.81 |
| 7,696,454 B2 * | 4/2010 | Nam | F24C 3/126 |
| | | | 219/393 |
| 7,791,188 B2 | 9/2010 | Sung | |
| 7,800,014 B2 * | 9/2010 | Thomas | B23K 26/361 |
| | | | 219/121.68 |
| 7,833,463 B1 | 11/2010 | Munson, Jr | |
| 7,867,404 B2 | 1/2011 | Deutsch | |
| 8,030,594 B2 * | 10/2011 | Thomas | B23K 26/04 |
| | | | 219/121.62 |
| 8,144,740 B1 * | 3/2012 | Brown | H01S 3/225 |
| | | | 372/55 |
| 8,182,609 B1 | 5/2012 | Le Claire et al. | |
| 8,246,172 B2 * | 8/2012 | Amano | G03B 21/005 |
| | | | 353/69 |
| 8,269,135 B2 | 9/2012 | Thomas et al. | |
| 8,304,686 B2 * | 11/2012 | Sano | B23K 26/0622 |
| | | | 219/121.61 |
| 8,348,655 B2 * | 1/2013 | Kuzusako | B29C 64/106 |
| | | | 264/494 |
| 8,371,339 B2 * | 2/2013 | Li | D04B 1/14 |
| | | | 139/415 |
| 8,536,483 B2 * | 9/2013 | Thomas | B23K 26/082 |
| | | | 219/121.68 |
| 8,604,380 B2 | 12/2013 | Howerton et al. | |
| 8,610,025 B2 | 12/2013 | Thomas et al. | |
| 8,687,189 B2 | 4/2014 | Agrawal et al. | |
| 8,980,639 B2 | 3/2015 | Clark et al. | |
| 9,108,387 B2 * | 8/2015 | Retz | B32B 5/22 |
| 9,370,842 B2 | 6/2016 | Thomas et al. | |
| 9,375,807 B2 | 6/2016 | Thomas et al. | |
| 9,481,052 B2 | 11/2016 | Thomas et al. | |
| 9,895,771 B2 * | 2/2018 | Thomas | B23K 26/36 |
| 10,086,597 B2 * | 10/2018 | Simko | B23K 26/50 |
| 10,112,257 B1 * | 10/2018 | Thomas | B23K 26/032 |
| 10,493,559 B2 * | 12/2019 | Straw | B23K 26/14 |
| 2002/0134770 A1 | 9/2002 | Freiwald et al. | |
| 2002/0153361 A1 | 10/2002 | Sakamoto | |
| 2003/0040164 A1 | 2/2003 | Inoue et al. | |
| 2003/0062349 A1 * | 4/2003 | Suh | C21D 10/005 |
| | | | 219/121.83 |
| 2003/0075531 A1 | 4/2003 | Kupisiewicz | |
| 2003/0083646 A1 | 5/2003 | Sirhan | |
| 2003/0085209 A1 * | 5/2003 | Lu | B23K 26/40 |
| | | | 219/121.69 |
| 2003/0090200 A1 * | 5/2003 | Topelberg | H05B 33/26 |
| | | | 313/511 |
| 2003/0098614 A1 * | 5/2003 | Shields | H02G 3/00 |
| | | | 307/10.1 |
| 2003/0169167 A1 * | 9/2003 | Fey | G01F 23/00 |
| | | | 200/1 R |
| 2004/0033311 A1 * | 2/2004 | Bayer | B23K 26/40 |
| | | | 427/248.1 |
| 2004/0045497 A1 | 3/2004 | Kriews et al. | |
| 2004/0057047 A1 | 3/2004 | Knebel | |
| 2004/0199151 A1 | 10/2004 | Neuberger | |
| 2004/0219286 A1 | 11/2004 | Flanagan | |
| 2005/0006345 A1 * | 1/2005 | Thomas | B08B 7/0042 |
| | | | 427/532 |
| 2005/0072612 A1 * | 4/2005 | Maggio | B62D 57/024 |
| | | | 180/21 |
| 2005/0150878 A1 * | 7/2005 | Thomas | B23K 26/40 |
| | | | 219/121.68 |
| 2005/0173052 A1 | 8/2005 | Mitarai | |
| 2005/0211680 A1 * | 9/2005 | Li | A61F 2/0077 |
| | | | 219/121.68 |
| 2005/0224474 A1 | 10/2005 | Kilburn | |
| 2005/0233547 A1 | 10/2005 | Noda | |
| 2005/0247683 A1 * | 11/2005 | Agarwal | B23K 26/40 |
| | | | 219/121.76 |
| 2006/0000488 A1 | 1/2006 | Claar et al. | |
| 2006/0027540 A1 * | 2/2006 | Bruland | B23K 26/04 |
| | | | 219/121.61 |
| 2006/0151433 A1 | 7/2006 | Chang et al. | |
| 2006/0153270 A1 * | 7/2006 | Matsumoto | B23K 26/034 |
| | | | 374/120 |
| 2006/0186098 A1 | 8/2006 | Caristan | |
| 2006/0273896 A1 * | 12/2006 | Kates | G08B 21/0484 |
| | | | 340/539.18 |
| 2007/0000885 A1 * | 1/2007 | Thomas | B08B 7/0042 |
| | | | 219/121.68 |

(56) References Cited

U.S. PATENT DOCUMENTS

| | | |
|---|---|---|
| 2007/0051469 A1 | 3/2007 | Bossi |
| 2007/0051708 A1 | 3/2007 | Talwar et al. |
| 2007/0114213 A1* | 5/2007 | Chen ................ B23K 26/0648 219/121.75 |
| 2007/0129474 A1 | 6/2007 | Salamone |
| 2007/0224768 A1* | 9/2007 | Chaplick ............... B08B 7/0042 438/308 |
| 2008/0006615 A1* | 1/2008 | Rosario ................ B23K 26/032 219/121.68 |
| 2008/0134939 A1 | 6/2008 | Arpac |
| 2009/0007933 A1* | 1/2009 | Thomas ................ B23K 26/36 219/121.81 |
| 2009/0080476 A1* | 3/2009 | Partlo ................... H01S 3/0057 372/25 |
| 2009/0242527 A1* | 10/2009 | Anger ...................... G02C 5/00 356/612 |
| 2009/0273782 A1* | 11/2009 | Yoo ..................... H01J 49/0463 250/281 |
| 2010/0033817 A1* | 2/2010 | Ono ...................... G02B 5/3083 219/121.72 |
| 2010/0044357 A1* | 2/2010 | Thomas .................. B23K 26/04 219/121.81 |
| 2010/0044359 A1* | 2/2010 | Sawabe .................. B23K 26/03 219/121.83 |
| 2010/0093112 A1* | 4/2010 | Takagi ................... B23K 26/03 219/121.6 |
| 2010/0134628 A1* | 6/2010 | Pfitzner ................. B23K 26/03 219/121.85 |
| 2010/0176101 A1* | 7/2010 | Costin .................... B29C 59/16 219/121.68 |
| 2010/0243625 A1 | 9/2010 | Osako |
| 2010/0272961 A1* | 10/2010 | Costin, Jr. ............ B23K 26/364 428/156 |
| 2011/0024400 A1* | 2/2011 | Rumsby .................... B41C 1/05 219/121.61 |
| 2011/0067808 A1 | 3/2011 | Nishio |
| 2011/0088720 A1 | 4/2011 | Varanasi et al. |
| 2011/0108531 A1* | 5/2011 | Stokes .................... B23K 26/40 219/121.68 |
| 2011/0115129 A1* | 5/2011 | Straw ................ B23K 26/0853 264/400 |
| 2011/0163068 A1* | 7/2011 | Utlaut ....................... G03F 1/84 216/66 |
| 2011/0168679 A1 | 7/2011 | Qi et al. |
| 2011/0186553 A1* | 8/2011 | Chung ................ H01M 50/531 219/121.68 |
| 2011/0203468 A1 | 8/2011 | Harada |
| 2011/0206071 A1* | 8/2011 | Karavitis ............... H01S 3/0057 372/25 |
| 2011/0240617 A1 | 10/2011 | Xu |
| 2012/0006806 A1 | 1/2012 | Thomas et al. |
| 2012/0086934 A1 | 4/2012 | Dignonnet |
| 2012/0321735 A1* | 12/2012 | Thomas ............... B23K 26/361 425/142 |
| 2013/0005059 A1 | 1/2013 | Song |
| 2013/0036380 A1* | 2/2013 | Symons ................ G06F 3/0482 715/804 |
| 2013/0136744 A1 | 5/2013 | Bouche et al. |
| 2013/0199732 A1* | 8/2013 | Niwa ......................... C09J 7/22 521/56 |
| 2013/0220982 A1* | 8/2013 | Thomas ............... B23K 26/0006 219/121.68 |
| 2013/0270234 A1 | 10/2013 | Thomas et al. |
| 2014/0038392 A1 | 2/2014 | Yonehars |
| 2014/0069897 A1* | 3/2014 | Thomas ................ B23K 26/36 219/121.81 |
| 2015/0013884 A1 | 1/2015 | Yeh |
| 2015/0202858 A1 | 7/2015 | Simko |
| 2016/0256959 A1* | 9/2016 | Thomas ............... B23K 26/082 |
| 2018/0161936 A1* | 6/2018 | Thomas ............... B23K 26/354 |
| 2018/0370212 A1 | 12/2018 | Simko |
| 2019/0001435 A1* | 1/2019 | Thomas ............... B23K 26/361 |

FOREIGN PATENT DOCUMENTS

| | | |
|---|---|---|
| FR | 2 661 371 | 4/1990 |
| FR | 2 689 423 | 4/1990 |
| GB | 2 246 099 A | 1/1992 |
| GB | 2 402 230 B | 12/2004 |
| GB | 2481190 A | 12/2011 |
| JP | 01203090 A | 8/1989 |
| JP | 02263854 A | 10/1990 |
| JP | 05082276 A | 4/1993 |
| JP | 05138377 A | 6/1993 |
| JP | 10309516 A | 11/1998 |
| JP | 2000103607 A | 4/2000 |
| JP | 2001300755 A | 1/2001 |
| JP | 200168829 | 3/2001 |
| JP | 361161781 A | 6/2003 |
| WO | 2004039531 A2 | 10/2004 |
| WO | 2013059779 A1 | 4/2013 |
| WO | 8301400 | 4/2019 |

OTHER PUBLICATIONS

Freiwald et al., "Laser Ablation of Contaminants fromConcrete and Metals Surfaces," Dec. 1994, pp. 1-53, F2 Associats, Incorporated.

Inta, "Radiant Energy Based Cleaning and Coating Removal Technology Comparison," Aug. 8, 1994, pgs.

Barone, Philip A. "Automated Laser Paint Stripping(ALPS)," Jun. 1, 1992, pgs. AD92-206-1 through AD92-206-17, Society of Manufacturing Engineers.

"The Company The Technology," Apr. 1997, General Lasertronics Corporation.

"Lasertronics Corporate Overview," Apr. 1997, Lasertronics Engineering Excellence.

"Lasertronics Aircraft Paint Removal," Apr. 1997, Lasertronics Engineering Excellence.

"Lasertronics Radiation/Medical Decontamination," Apr. 1997, Lasertronics Engineering Excellence.

"Lasertronics Graffiti Abatement," Apr. 1997, Lasertronics Engineering Excellence.

"Lasertroniics Lead-Based Paint Removal," Apr. 1997, Lasertronics Engineering Excellence.

Drscoll et al., "Handbook of Optics," Dec. 1978, pp. 13-16 through 13-10, McGraw-Hill Book Company.

Liu et al., "Paint Removal Using Lasers," Jul. 20, 1995, pp. 4409-4414, Applied Optics, vol. 34, No. 21.

Lovoi, Paul, "Laser Paint Stripping Offers Control and Flexibility," Nov. 1994, pp. 75-80, Laser Focus World.

Bonkowski et al., "CW Laser Paint Stripping," Aug. 1991, pp. 1-20, The Laser Institute and National Science and Engineering Research Council.

Lovoi, Paul,"Laser/Robot Paint Stripping, Laser Ablation CoatingRemoval," Apr. 1988, International Technical Associates.

Tavernier et al., "Photoluminescence from laser assisted debonded epitaxial GaN and ZnO films", Applied Physics Letters 74(18), pp. 2678-2680 (May 3, 1999).

Horie et al., "Interface structure modified by plasma-surface interaction and its effect on ablative hole opening process in a bilayer system of TeSeF film and a fluorocarbon subbing layer", Journal of Applied Physics 77, 162-166 (Jan. 1995), American Institute of Physics.

Kononenko et al., "Ablation of CVD diamond with nanosecond laser pulses of UV-IR range", Apr. 1998, Elsevier, Diamond and Related Materials, vol. 7, pp. 1623-1627.

Montelica-Heino et al., "Macro and Microchemistry of trace metals in vitrified domestic wastes by laser ablation ICP-MS and scanning electron microprobe X-Ray energy dispersive spectroscopy", Aug. 1998, Elsevier, Talanta, pp. 407-422.

Hagans et al., "Chromate Conversion Coatings", Dec. 1994, ASM Handbook, vol. 5, Surface Engineering, pp. 405-411.

Robertson, "Diamond-like amorphous carbon", Dec. 2002, Elsevier, Materials Science and Engineering R, vol. 37, pp. 129-281.

(56) References Cited

OTHER PUBLICATIONS

Rothgeb, "Final Report on NASA portable laser coating removal systems filed demonstrations and testing," May 1, 2008, NASA.

* cited by examiner

COATING ABLATING APPARATUS WITH COATING REMOVAL DETECTION

RELATED APPLICATIONS

This application is a continuation of U.S. patent application Ser. No. 17/351,908, filed on Jun. 18, 2021, and entitled "A COATING ABLATING APPARATUS WITH COATING REMOVAL DETECTION" which is a divisional of U.S. patent application Ser. No. 16/123,210, filed on Sep. 6, 2018, and entitled "A COATING ABLATING APPARATUS WITH COATING REMOVAL DETECTION" which is a continuation of U.S. patent application Ser. No. 13/177,431, filed on Jul. 6, 2011, and entitled "A COATING ABLATING APPARATUS WITH COATING REMOVAL DETECTION" which claims priority of U.S. provisional application, Ser. No. 61/362,976, filed Jul. 9, 2010, and entitled "Non-Color Sensing for Laser Decoating." The U.S. patent application Ser. No. 17/351,908, filed on Jun. 18, 2011, and entitled "A COATING ABLATING APPARATUS WITH COATING REMOVAL DETECTION", U.S. patent application Ser. No. 16/123,210, filed on Sep. 6, 2018, and entitled "A COATING ABLATING APPARATUS WITH COATING REMOVAL DETECTION", U.S. patent application Ser. No. 13/177,431, filed on Jul. 6, 2011, and entitled "A COATING ABLATING APPARATUS WITH COATING REMOVAL DETECTION" and the provisional application Ser. No. 61/362,976, filed Jul. 9, 2010, and entitled "Non-Color Sensing for Laser Decoating which are all incorporated herein by reference.

FIELD OF THE INVENTION

The invention relates to ablating a coating using a laser. In particular, the invention relates to a coating ablating apparatus for detecting the removal of a coating from a surface using a laser to prevent surface damage.

BACKGROUND OF THE INVENTION

Laser-based coating removal systems use pulses of light from high power lasers to ablate or vaporize the paint or other coating from a surface. Each pulse removes the coating from a small region, typically 0.1 to 100 square mm. The laser is pointed to a different area after each pulse, where the removal process is repeated until the entire surface is cleaned. An advantage of lasers for coating removal is that each laser pulse removes a predictable portion of the thickness of the coating, in the small region impacted by the pulse. This opens the possibility of selective stripping where, for example, the topcoat could be removed but not the primer.

A problem with laser de-coating systems is the possibility of damaging the surface if the stripping process is continued after all the coating is removed. A particular source of the possible damage is the result of overheating the surface due to the absorption of the excess laser light by the surface after the coating has been removed. Previous techniques to overcome this problem have relied on measuring the color of the surface at each point within the laser scan field prior to firing the laser at that point. However, these techniques do not work well if the distance and the angle from the laser optics to the substrate vary widely as is the case in many handheld laser de-coating systems on non-flat surfaces.

SUMMARY OF THE INVENTION

Embodiments of the present invention are directed to a laser-based coating removal apparatus to remove a coating from a surface without damaging the surface. The apparatus comprises a laser source to provide a laser light, a routing element coupled to the laser source and configured to direct the laser light onto a target region of the surface thereby removing the coating from the target region, and a detection element to detect the coating as the coating separates from the target region of the surface. The detection element is able to prevent the surface from being damaged by limiting or eliminating the laser light directed onto the target region after all the coating has been removed. The detection element is able to detect the separation of the coating from the target region by detecting incandescence, acoustic signature, motion, fluorescence and/or chemical properties produced by the separation of the coating from the surface.

In one aspect the present application relates to a laser-based coating removal apparatus to remove a coating from a surface. The apparatus comprises a laser source to provide a laser light, a routing element coupled to the laser source and configured to direct the laser light onto a target region of the surface and a detection element to detect the coating as the coating separates from the target region of the surface. In some embodiments, the detection element detects the separation of the coating from the target region by detecting one or more coating properties selected from the group consisting of the incandescence, acoustic signature, motion, fluorescence and chemical properties. In some embodiments, the routing element transmits a signal related the one or more coating properties to the detection element such that the detection element is able to detect if the coating is separating from the target region. In some embodiments, the rate at which the laser light is directed onto the surface is adjusted based on whether the detection element detects that the coating is separating from the target region. In some embodiments, if the detection element does not detect the coating separating from the target region for a period, a controller coupled to the detection element decreases the rate at which the laser light is directed onto the target region to a preselected low rate. In some embodiments, the controller is able to adjust the length of the period based on one or more characteristics of the target region. In some embodiments, the controller is able to adjust the level of the low rate based on the one or more characteristics of the target region. In some embodiments, if the detection element detects the coating separating from the target region while the rate at which the laser light is directed onto the target region is equal to the low rate, the controller increases the rate at which the laser light is directed onto the target region to a preselected high rate. In some embodiments, the controller is able to adjust the level of the high rate based on the one or more characteristics of the target region. In some embodiments, the one or more characteristics of the target region comprise a temperature of the target region. In some embodiments, the high rate is equal to continuous projection of the laser light onto the target region and the low rate is equal to none of the laser light being projected onto the target region. In some embodiments, the high rate and the low rate are proportional to each other such that if one of the high or low rate is adjusted, the other rate is also adjusted in proportion. In some embodiments, the detection element divides the target region into a plurality of detection areas and if the detection element does not detect the coating separating from the target region in one or more of the detection areas for the period, the controller decreases the rate at which the laser light is directed onto the target region to the preselected low rate.

A second aspect of the present application is directed to a laser-based coating removal system. The system comprises a surface having a coating and a laser-based removal apparatus comprising a laser source to provide a laser light, a routing element coupled to the laser source and configured to direct the laser light onto a target region of the surface and a detection element to detect the coating as the coating separates from the target region of the surface. In some embodiments, the detection element detects the separation of the coating from the target region by detecting one or more coating properties selected from the group consisting of the incandescence, acoustic signature, motion, fluorescence and chemical properties. In some embodiments, the routing element transmits a signal related the one or more coating properties to the detection element such that the detection element is able to detect if the coating is separating from the target region. In some embodiments, the rate at which the laser light is directed onto the surface is adjusted based on whether the detection element detects that the coating is separating from the target region. In some embodiments, if the detection element does not detect the coating separating from the target region for a period, a controller coupled to the detection element decreases the rate at which the laser light is directed onto the target region to a preselected low rate. In some embodiments, the controller is able to adjust the length of the period based on one or more characteristics of the target region. In some embodiments, the controller is able to adjust the level of the low rate based on the one or more characteristics of the target region. In some embodiments, if the detection element detects the coating separating from the target region while the rate at which the laser light is directed onto the target region is equal to the low rate, the controller increases the rate at which the laser light is directed onto the target region to a preselected high rate. In some embodiments, the controller is able to adjust the level of the high rate based on the one or more characteristics of the target region. In some embodiments, the one or more characteristics of the target region comprise a temperature of the target region. In some embodiments, the high rate is equal to continuous projection of the laser light onto the target region and the low rate is equal to none of the laser light being projected onto the target region. In some embodiments, the high rate and the low rate are proportional to each other such that if one of the high or low rate is adjusted, the other rate is also adjusted in proportion. In some embodiments, the detection element divides the target region into a plurality of detection areas and if the detection element does not detect the coating separating from the target region in one or more of the detection areas for the period, the controller decreases the rate at which the laser light is directed onto the target region to the preselected low rate.

Another aspect of the present application is directed to a laser-based method of removing a coating from a surface. The method comprises activating a laser source to provide a laser light, directing the laser light onto a target region of the surface with a routing element and detecting if the coating is separating from the target region of the surface with a detection element. In some embodiments, the detection element detects the separation of the coating from the target region by detecting one or more coating properties selected from the group consisting of the incandescence, acoustic signature, motion, fluorescence and chemical properties. The method further comprises transmitting a signal related the one or more coating properties with the routing element to the detection element such that the detection element is able to detect if the coating is separating from the target region. The method further comprises adjusting the rate at which the laser light is directed onto the surface based on whether the detection element detects that the coating is separating from the target region. The method further comprises decreasing the rate at which the laser light is directed onto the target region to a preselected low rate if the detection element does not detect the coating separating from the target region for a period. The method further comprises adjusting the length of the period based on one or more characteristics of the target region. The method further comprises adjusting the level of the low rate based on the one or more characteristics of the target region. The method further comprises increasing the rate at which the laser light is directed onto the target region to a preselected high rate if the detection element detects the coating separating from the target region while the rate at which the laser light is directed onto the target region is equal to the low rate. The method further comprises adjusting the level of the high rate based on the one or more characteristics of the target region. In some embodiments, the one or more characteristics of the target region comprise a temperature of the target region. In some embodiments, the high rate is equal to continuous projection of the laser light onto the target region and the low rate is equal to none of the laser light being projected onto the target region. In some embodiments, the high rate and the low rate are proportional to each other such that if one of the high or low rate is adjusted, the other rate is also adjusted in proportion. The method further comprises decreasing the rate at which the laser light is directed onto the target region to the preselected low rate if the detection element does not detect the coating separating from the target region in one or more of a plurality of detection areas for the period, wherein the detection areas each comprise a portion of the target region. The method further comprises adjusting the size of the detection areas based on the characteristics of the surface.

BRIEF DESCRIPTION OF THE DRAWINGS

Embodiments of the coating removal device are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the present invention are directed to a laser-based coating removal apparatus to remove a coating from a surface without damaging the surface. The apparatus comprises a laser source to provide a laser light, a routing element coupled to the laser source and configured to direct the laser light onto a target region of the surface thereby removing the coating from the target region, and a detection element to detect the coating as the coating separates from the target region of the surface. The detection element is able to prevent the surface from being damaged by limiting or eliminating the laser light directed onto the target region after all the coating has been removed. The detection element is able to detect the separation of the coating from the target region by detecting incandescence, acoustic signature, motion, fluorescence and/or chemical properties produced by the separation of the coating from the surface.

Reference will now be made in detail to implementations of the laser-based coating removal apparatus as illustrated in the accompanying drawings. The same reference indicators will be used through the drawings and the following detailed description to refer to the same or like parts. In the interest of clarity, not all of the routine features of the implementations described herein are shown and described. It will also be appreciated that in the development of any such actual implementation, numerous implementation-specific decisions be made to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
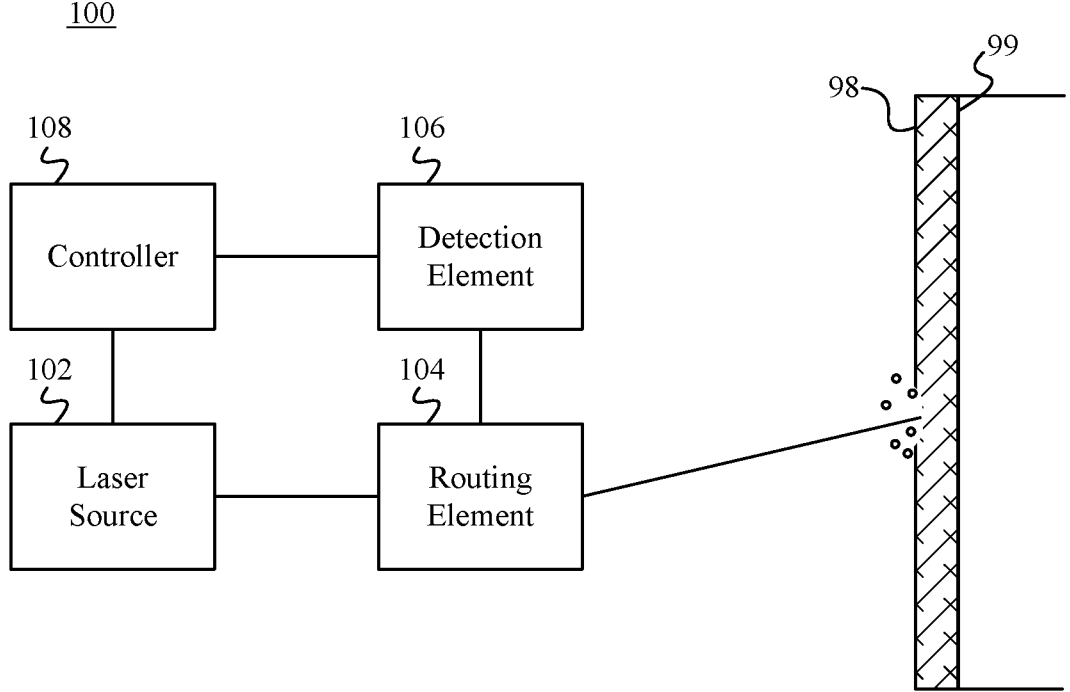
FIG. 1A illustrates an exemplary block diagram of the coating removal system having a common detection path according to some embodiments.

FIG. 1A illustrates an exemplary block diagram of a coating removal system 100 using a common path according to some embodiments. The coating removal system 100 comprises a laser source 102, a routing element 104, a detection element 106 and a controller 108 for removing a coating 98 from a surface 99. In some embodiments, the system 100 comprises one or more additional laser sources 102, routing elements 104, detection elements 106 and/or controllers 108. The laser source 102 is able to comprise one or more lasers. Alternatively, the laser source 102 is able to comprise other components capable of outputting laser light 97 (see FIGS. 2A and 2B) as are well known in the art. The laser source 102 is coupled to routing element 104 such that laser light 97 output by the laser source 102 is received by the routing element 104 such that the routing element 104 is able to manipulate and direct/route the laser light 97 onto the desired portion of the surface 99 having the coating 98 to be removed. Specifically, the routing element 104 is optically coupled to the surface 99/coating 98 such that the routing element 106 is able to direct the laser light 97 received from the laser source 102 onto the surface 99 to effectuate the removal of the coating 98 from the surface 99.

As shown in FIG. 1A, the routing element 104 is also coupled to the input of the detection element 106 such that one or more of the properties of the surface 99 and/or the coating 98 (as the coating 98 is being removed from the surface 99), are able to be transmitted to the detection element 106 by the routing element 104. In other words, both the laser source 102 and the detection element 106 are able to use a common path through the routing element 104 to access the surface 99 and/or coating 98. For example, components of the routing element 104 used for routing the laser light 97 to the surface 99 are able to be used to receive incandescent light from the coating 98 caused by the removal of the coating 98 from the surface 99 and transmit that received incandescent light (or a signal 96 corresponding to the incandescent light (see FIG. 2A)) to the detection element 106. Alternatively, signals 96 corresponding to other properties of the surface 99 and/or coating 98 are able to be transmitted to the detection element 106 by the routing element 104 such as acoustic signature, motion, fluorescence and other detectable chemical properties of the surface 99/coating 98 as are well known in the art. The detection element 106 is able to receive the one or more signals of properties 96 corresponding to the surface 99 and/or coating 98 from the routing element 104 and determine if the coating 98 is currently separating from the surface 99. Specifically, the detection element 106 is able to determine if the coating 98 is currently separating from the surface 99 by determining if the detected properties exceed a preselected threshold indicating that separation is currently occurring in the detected area of the surface 99.

The controller 108 is coupled to the detection element 106 and the laser source 102 such that the controller 108 is able to control the operation of the laser source 102 based on the output received from the detection element 106. Specifically, the controller 108 is able to adjust the rate and/or intensity at which the laser light 97 is output by the laser source 102 based on whether the output of the detection element 106 indicates that the coating 98 is currently being removed or if the removal of the coating 98 is no longer being detected. As a result, during the process of removing the coating 98 from the surface 99, the system 100 is able to determine when the coating 98 is no longer being removed from the surface 99 (e.g. all the coating 98 has been removed) and lower or raise the rate and/or intensity of the laser light 97 output onto the surface 99 accordingly in order to efficiently remove the coating 98 while preventing the surface 99 from being damaged from the laser light 97. The controller 108 is able to comprise various designs of one or more electronic devices well known in the art which are not discussed herein for the sake of brevity. In some embodiments, one or more of the components of the coating removal system 100 are incorporated into a single coating removal apparatus. Alternatively, the components of the coating removal system 100 are able to comprise multiple devices.

Figure 1B:
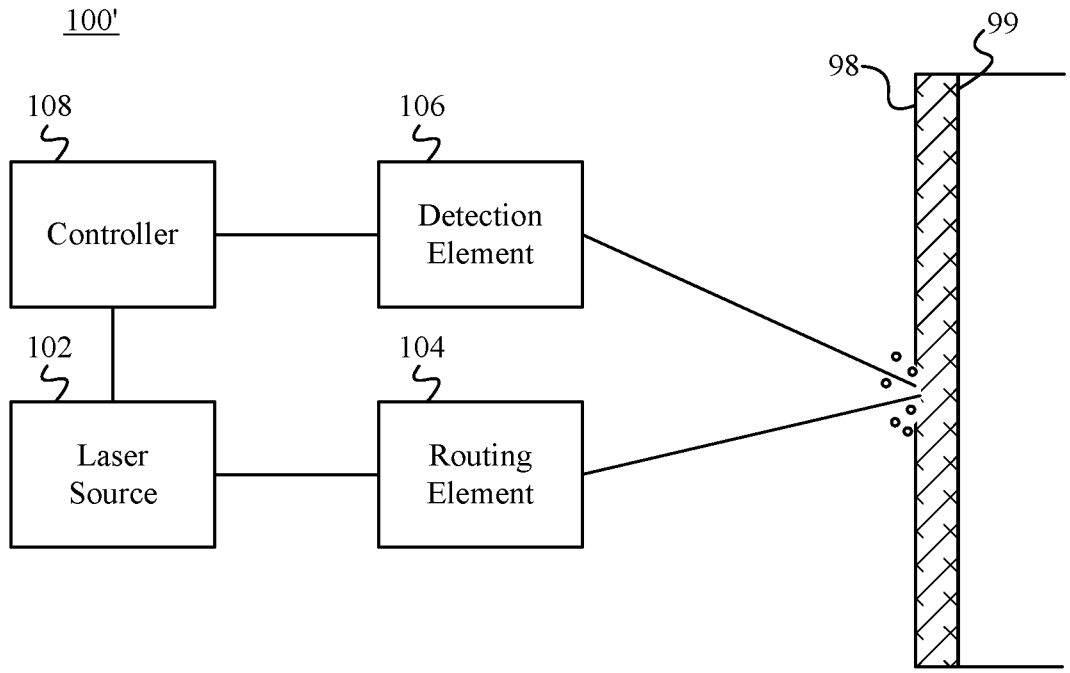
FIG. 1B illustrates an exemplary block diagram of the coating removal system having a separate detection path according to some embodiments.

FIG. 1B illustrates an exemplary block diagram of the coating removal system 100' having a separate detection path according to some alternative embodiments. The system 100' shown in FIG. 1B is substantially similar to the system 100 except for the differences described herein. Specifically, the detection element 106 of the system 100' is coupled directly to the surface 99 and/or the coating 98 forming a separate detection path instead of coupling through the routing element 104. The manner in which the detecting element 106 is coupled to the surface 99/coating 98 depends on the one or more types of surface 99/coating 98 properties used to determine if the coating 98 is currently being removed. For example, if the incandescence produced by the removed coating 98 is to be detected, the detecting element 106 is optically coupled to the surface 99/coating 98. Alternatively, other manners of coupling or combination of manners of coupling are able to be used as are well known in the art in order to detect one or more of incandescence, acoustic signature, motion, fluorescence and other detectable chemical properties of the surface 99/coating 98. As a result, the detection element 104 is able to directly monitor and receive signals 96 (see FIG. 2B) from the surface 99 and/or coating 98 as the system 100' is operating and output to the controller 108 whether the removal of the coating 98 is currently detected. Alternatively, the detection element 106 is able to be coupled to both the routing element 104 and the surface 99/coating 98 such that the detection element 106 is able to receive signals 96 corresponding to the properties of the coating 98 and/or surface 99 as the coating 98 is removed from the surface 99 from the surface 99/coating 98 directly, via the routing element 104 or both.

Figure 2A:
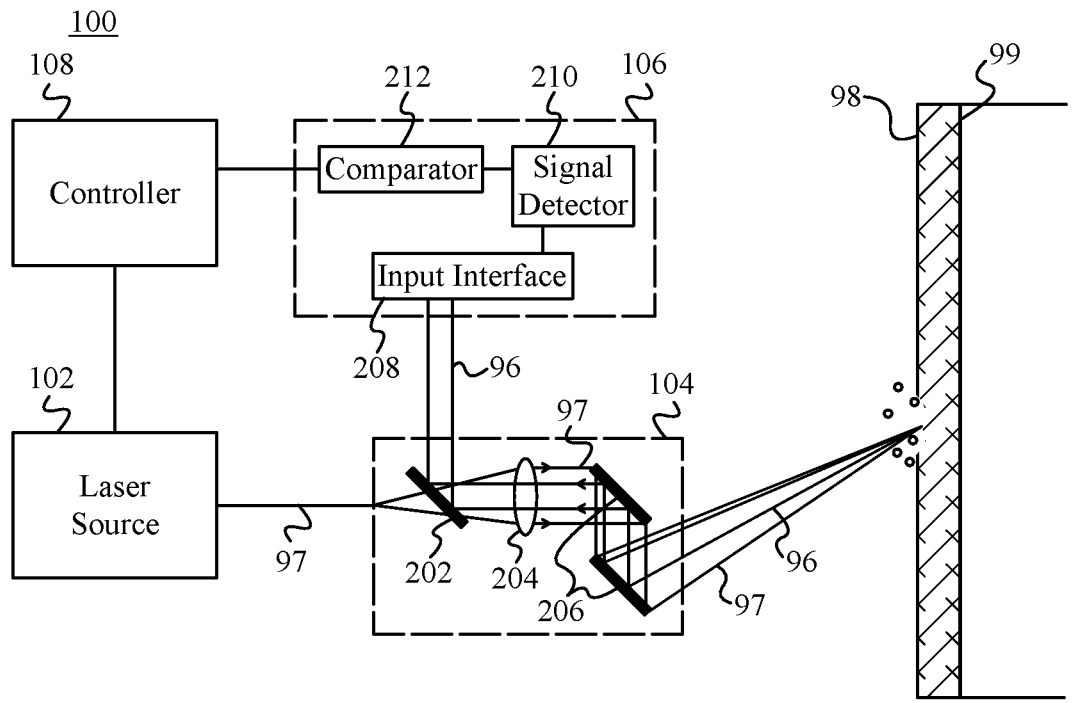
FIG. 2A illustrates a more detailed diagram of an exemplary block diagram of the coating removal system having a common detection path according to some embodiments.

FIG. 2A illustrates a more detailed diagram of a coating removal system 100 using a common path according to some embodiments. As shown in FIG. 2A, the routing element 104 comprises a beam splitter 202, focusing optics 204 and scanning optics 206. The focusing optics 204 receive and focus light passing through the beam splitter 202 from the light source 102 to the scanning optics 206 which align and focus the laser light 97 onto the coating/surface 98, 99. The scanning optics 206 also receive signals 96 (e.g. incandescent light from gaseous removed coating 98) that are routed from the scanning optics 206 to the beam splitter 202 (via the focusing optics 204). The beam splitter 202 receives the signals 96 and routes the signals 96 to the detection element 106. As a result, the routing element 104 is able to utilize the common path to simultaneously route the laser light 97 onto the surface/coating 98, 99 and receives/transmits signals 96 (e.g. detected coating 98 gaseous incandescence upon removal) related to one or more properties of the removal of the coating 98 from the surface 99 to the detection element 106 for determining the state of the coating removal process. It is understood that the routing element 104 is able to comprise less or more components for routing the laser light 97 and/or transmitting the surface/coating signals 96 to the detection element 106 as are well known in the art. For example, in some embodiments, the routing element 104 is able to comprise audio, electrical and/or chemical detection and transmission elements enabling the routing element 104 to use the common path to simultaneously route, in addition to light, audio, electrical, chemical and/or other types of signals 96 related to the properties of the removal of the coating 98 from the surface 99 to the detection element 106.

As also shown in FIG. 2A, the detection element 106 comprises an input interface 208, a signal detector 210 and a comparator 212. In some embodiments, the input interface 208 comprises an input lens for receiving a light signal 96. Alternatively, the input interface 208 is able to comprise one or more other components for receiving audio, visual, electrical, chemical and other types of signals 96 as are well known in the art. In some embodiments, the signal detector 210 is a photosensitive device such as a photodiode for receiving a light signal. Alternatively, the signal detector 210 is able to be other detecting devices such as a microphone or other types of detectors able to detect one or more of incandescence, acoustic signature, motion, fluorescence and other detectable chemical properties of the surface 99/coating 98. For example, in order to detect an acoustic signature of the separating coating 98, the signal detector 210 is able to comprise a microphone for converting the received audio signal to a desired corresponding signal and a filter to separate sounds generated from the separated coating 98 from other noise. In some embodiments, the comparator 212 comprises an amplifier for comparing the signal 96 to a threshold voltage. Alternatively, the comparator 212 is able to comprise other components for comparing a received signal 96 to a reference as are well known in the art.

In operation, the input interface 208 receives the signals 96 from the routing element 104 and transmits the signals 96 to the signal detector 210. The signal detector 210 converts the received signal 96 to a desired corresponding signal and transmits the corresponding signal to the comparator 212 which determines if the received corresponding signal indicates that the coating 98 is currently being removed from the surface 99. In some embodiments, the comparator 212 makes this determination by determining if a voltage of the corresponding signal exceeds a predetermined threshold voltage. Alternatively, the comparator 212 is able to make the determination based on voltage and/or one or more other properties of the corresponding signal as are well known in the art. As a result, the detection element 106 is able to output a detection signal to the controller 108 indicating whether the coating 98 is currently being detected as being currently removed from the surface 99. It is understood that the detection element 106 is able to comprise less or more components for determining if the surface/coating signals 96 indicate that the coating 98 is currently being removed from the surface 99 as are well known in the art. For example, the input interface 208 is able to be omitted and the signal 96 is able to be received directly by the signal detector 210.

As described above in relation to FIG. 1A, the controller 108 adjusts the rate and/or intensity at which the laser light 97 is output by the laser source 102 based on whether the coating 98 is currently being removed or if the removal of the coating 98 is no longer being detected. In some embodiments, the controller 108 increases the intensity and/or rate/frequency at which the light 97 is output from a predetermined low level to a predetermined high level when the removal of the coating 98 is detected. For example, the controller 108 is able to increase the rate and/or intensity from 0 or 1% of the normal rate/intensity to 100% of the normal rate/intensity upon detecting the removal of the coating 98. Alternatively, the low and high levels are able to be other percentages of the normal rate/intensity or preselected rate/intensity values. Alternatively, the rate and/or intensity is able to be adjusted gradually/incrementally by the controller 108. In some embodiments where both rate and intensity values are adjusted, the rate value and frequency value are able to be adjusted to different levels dependently or independently.

Similarly, in some embodiments, the controller 108 decreases the intensity and/or rate at which the light 97 is output from the predetermined high level to the predetermined low level when the removal of the coating 98 is not detected for a period. In some embodiments, the period is 50 milliseconds. Alternatively, other periods are contemplated. In some embodiments, the period, predetermined high level and/or predetermined low level are able to be adjusted based on the characteristics of the surface 99. For example, if the rate of change of the surface temperature is low, the surface temperature is low and/or the surface is able to endure high temperatures before becoming damaged, the period and/or low level is able to be increased to reflect the resistance to damage of the surface 99. As a result, during the process of removing the coating 98 from the surface 99, the system 100 is able to determine when the coating 98 is no longer being removed from the surface 99 (e.g. all the coating 98 has been removed) and lower the rate and/or intensity of the laser light 97 output onto the surface 99 in order to prevent the surface 99 from being damaged from the laser light 97.

Figure 2B:
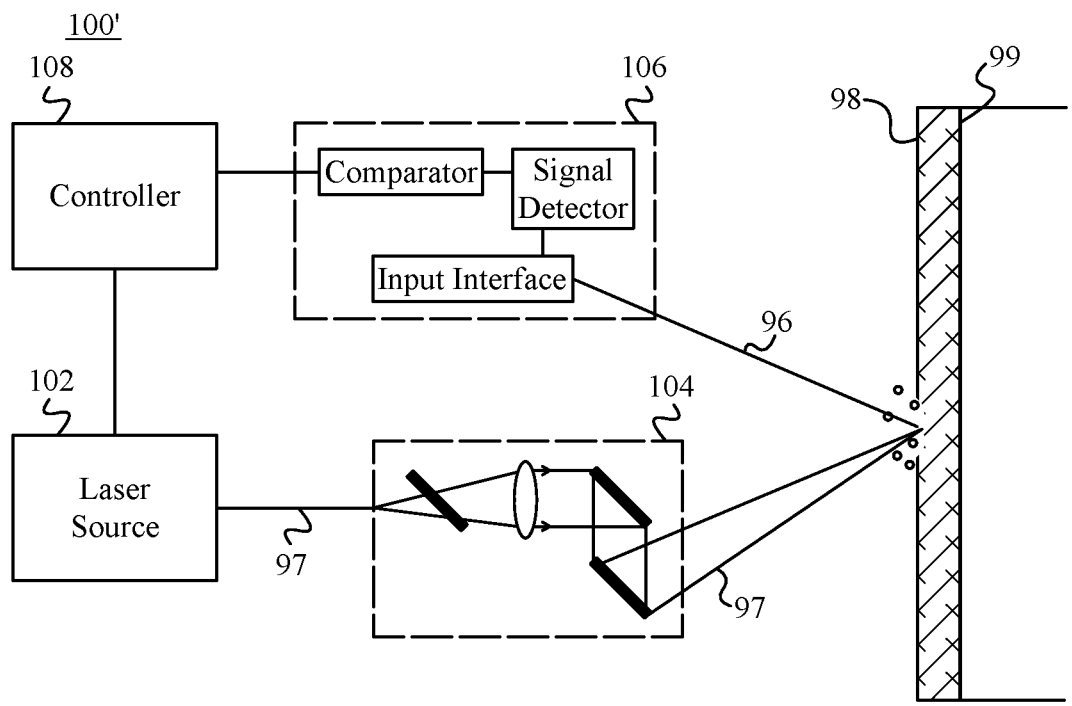
FIG. 2B illustrates a more detailed diagram of an exemplary block diagram of the coating removal system having a separate detection path according to some embodiments.

FIG. 2B illustrates a more detailed diagram of a coating removal system 100' with a separate detection path according to some embodiments. The system 100' shown in FIG. 2B is substantially similar to the system 100 shown in FIG. 2A except for the differences described herein. Specifically, the input interface 208 of the detection element 106 of the system 100' is coupled directly to the surface 99 and/or the coating 98 forming a separate detection path instead of coupling through the routing element 104. As described above in relation to FIG. 1B, the manner in which the input interface 208 is coupled to the surface 99/coating 98 depends on the one or more types of surface 99/coating 98 properties used to determine if the coating 98 is currently being removed. For example, if the incandescence produced by the removed coating 98 is to be detected, the input interface 208 is able to comprise a lens that is optically coupled to the surface 99/coating 98. Alternatively, other manners of coupling or combination of manners of coupling are able to be used as are well known in the art in order to detect one or more of incandescence, acoustic signature, motion, fluorescence and other detectable chemical properties of the surface 99/coating 98. As a result, the detection element 104 is able to directly monitor and receive signals 96 from the surface 99 and/or coating 98 as the system 100' is operating and output the detection signal to the controller 108 indicating whether the removal of the coating 98 is currently detected. In some embodiments, the input interface 208 is able to be coupled to both the routing element 104 and the surface 99/coating 98 such that the detection element 106 is able to receive signals 96 corresponding to the properties of the coating 98 and/or surface 99 as the coating 98 is removed from the surface 99 from the surface 99/coating 98 directly, via the routing element 104 or both. In some embodiments, the input interface 208 is able to be omitted and instead the signal detector 210 is able to be coupled directly to the surface 99/coating 98, via the routing element 104 or both.

In some embodiments, the detection element 104 is able to define a plurality of detection areas, which are a fraction of a target area of the surface 99/coating 98 contacted by the laser light 97 during the removal process, in order to guard against the situation where one are of the target surface is being damaged even though coating removal is still being detected in another part of the target area. Specifically, using the smaller detection areas, the detection element 104 to able to individually detect whether coating removal is absent in one or more of the detection areas and lower the laser rate and/or intensity even though coating removal is still being detected in another detection area (i.e. another part of the target area). Thus, by refining the size/number of detection areas defined within the target area, the system 100, 100' is able to minimize the chance that current coating removal at one end of the target area is able to occur while another end of the target area is being damaged. In some embodiments, the system 100, 100' is also able to reduce the risk of damage by enabling a user to selectively choose the one or more types of properties of the surface 99/coating 98 the system 100, 100' should detect in order to determine if the coating 98 is currently being removed. For example, a user is able to select one or a combination of light, audio and chemical properties to detect based on what is determined as the most accurate indicator for a particular surface 99/coating 98. Thus, the system 100, 100' is able to be customized for each job in order to most effectively reduce the risk of surface damage.

Figure 3:
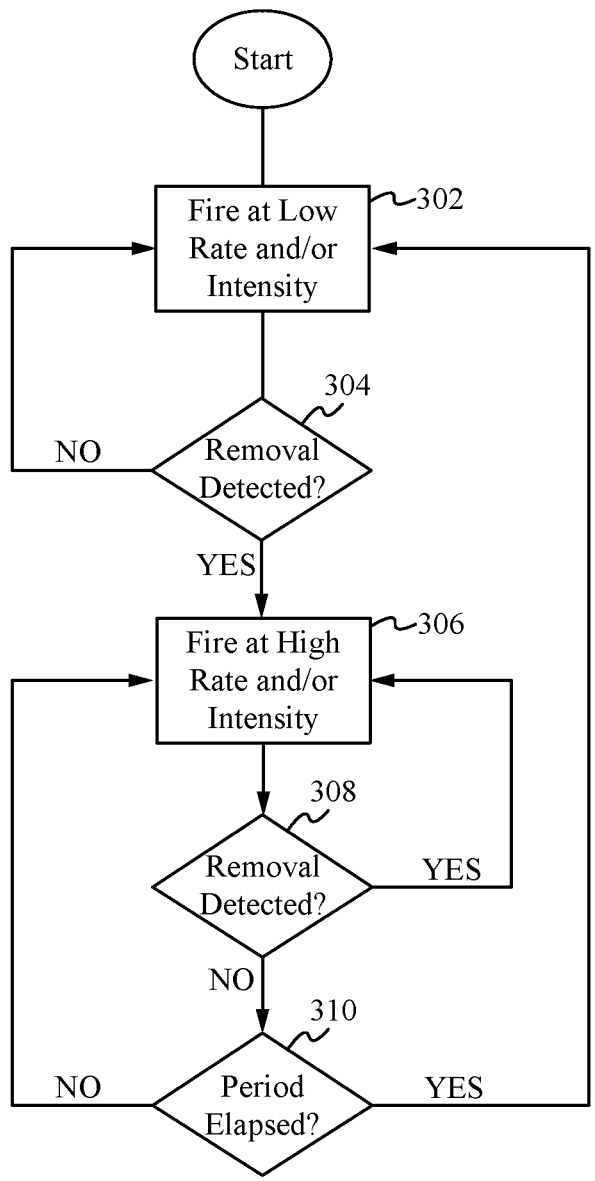
FIG. 3 illustrates a flow chart of a method of removing a coating from a surface according to some embodiments.

FIG. 3 illustrates a flow chart of a method of removing a coating from a surface according to some embodiments. The controller 108 activates the laser source 102 and begins firing the laser light 97 at the low rate and/or intensity onto the target region of the surface at the step 302. Alternatively, the controller 108 is able to cause the laser source 102 to begin firing at the high rate and/or intensity as described in step 306 below. The detection element 106 detects if the coating 98 is currently separating from the target region of the surface 99, wherein the system 100, 100' returns to step 302 (firing at the low rate/intensity) if removal is not detected and advances to step 306 if removal is detected at the step 304. In some embodiments, the detection element 106 detects the separation of the coating 98 from the target region by detecting one or more coating properties selected from the group consisting of the incandescence, acoustic signature, motion, fluorescence and chemical properties. In some embodiments, a signal 96 related to the one or more coating properties is transmitted by the routing element 104 to the detection element 106 such that the detection element 106 is able to detect if the coating 98 is separating from the target region. The controller 108 increases the rate and/or intensity at which the laser light 97 is directed onto the target region to a preselected high rate at the step 306. In some embodiments, the level of the preselected high rate is adjusted based on the one or more characteristics of the target region. In some embodiments, the one or more characteristics of the target region comprise a temperature of the target region. The detection element 106 detects if the coating 98 is currently separating from the target region of the surface 99, wherein the system 100, 100' returns to step 306 (firing at the high rate/intensity) if removal is detected and advances to step 310 if removal is not detected at the step 308. The controller 108 determines if the detection element 106 has not detected the coating 98 separating from the target region for a predefined period, wherein if the period has not elapsed the system 100, 100' returns to step 306 (firing at the high rate/intensity) and if the period has elapsed the system 100, 100' returns to step 302 (firing at the low rate/intensity) at the step 310.

In some embodiments, the length of the period is adjusted automatically by the controller 108 or by a user based on one or more characteristics of the target region. In some embodiments, the level of the low rate is adjusted automatically by the controller 108 or by a user based on the one or more characteristics of the target region. In some embodiments, the high rate is equal to continuous projection of the laser light 97 onto the target region and the low rate is equal to none of the laser light 97 being projected onto the target region. In some embodiments, the high rate and the low rate are proportional to each other such that if one of the high or low rate is adjusted, the other rate is also adjusted in proportion. In some embodiments, one or more detection areas are defined and the rate at which the laser light 97 is directed onto the target region is decreased to the preselected low rate if the detection element 106 does not detect the coating 98 separating from the target region in one or more of the detection areas for the period. In some embodiments, the detection areas each comprise a portion of the target region. In some embodiments, the size of the detection areas are adjusted automatically by the system 100, 100' or by a user based on the characteristics of the surface 99 and/or the coating 98. Accordingly, the coating removal system 100, 100' is able to minimize the risk of damage to the surface 99 by dynamically detecting if the coating 98 is no longer being removed from the surface 99 such that the surface 99 is being directly subjected to damaging laser light 97.

Thus, it is clear that the coating removal system described herein has numerous advantages. Specifically, the coating removal system is able to efficiently remove coatings on a surface without damaging the surface by detecting when all the coating has been removed. Further, this damage prevention is able to effectively operate even if the distance and the angle from the laser optics to the substrate vary widely as is the case in many handheld laser de-coating systems on non-flat surfaces. Moreover, the damage prevention aspect is able to be dynamically adjusted based on the characteristics of the surface and/or the properties of the coating and its separation from the surface. As a result, the coating removal system is able to save energy and cost while still ensuring that no damage is caused to the surface by the system.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A laser-based coating removal apparatus to remove a coating from a surface, the apparatus comprising:
   a. a laser source to provide a laser light for removing the coating from a target region of the surface;
   b. a routing element coupled to the laser source and configured to direct the laser light onto a target region of the surface;
   c. a detection element to detect the coating as the coating separates from the target region of the surface by inputting a signal received from the surface at the target region; and
   d. a controller configured to adjust a current firing rate of the laser light based on the signal received from the surface at the target region, wherein the controller is able to adjust a length of a detection period of the detection element based on one or more characteristics of the surface in the target region.

2. The apparatus of claim 1 wherein the signal comprises data indicating one or more properties selected from the group consisting of the incandescence, acoustic signature, motion, fluorescence and chemical properties.

3. The apparatus of claim 2 wherein the routing element receives the signal from the surface and transmits the signal to the detection element such that the detection element is able to detect if the coating has separated from the surface.

4. The apparatus of claim 1 wherein an amount of energy per second directed onto the surface by the laser light is adjusted from a first non-zero amount to a second non-zero amount different than the first non-zero amount based on whether the detection element detects that the coating has separated from the surface in the target region.

5. The apparatus of claim 1 wherein if the detection element does not detect the coating separating from the target region for the detection period, the controller coupled to the detection element decreases the rate at which the laser light is directed onto the target region to a non-zero preselected low value.

6. The apparatus of claim 5 wherein the controller is able to adjust the level of the non-zero preselected low value based on the one or more properties of the surface in the target region.

7. The apparatus of claim 6 wherein if the detection element detects the coating has not yet separated from the surface in the target region for a duration while the amount of energy per second directed onto the target region by the laser light is equal to the non-zero preselected low value, the controller increases the amount of energy per second directed onto the target region by the laser light to the non-zero preselected high value.

8. The apparatus of claim 7 wherein the controller is able to adjust the level of the non-zero preselected high value based on the one or more properties of the surface in the target region.

9. The apparatus of claim 8 wherein the one or more properties of the surface in the target region comprise a temperature of the surface in the target region.

10. The apparatus of claim 9 wherein the non-zero preselected high value is equal to a maximum amount of energy per second produced when the laser light has a maximum intensity and frequency and the non-zero preselected low value is equal to a minimum amount of energy per second produced when the laser light has a non-zero minimum intensity and frequency.

11. The apparatus of claim 10 wherein the non-zero preselected high value and the non-zero preselected low value are proportional to each other such that if the non-zero preselected high or value rate is adjusted, the non-zero preselected low value is adjusted in proportion to the non-zero preselected high value and if the non-zero preselected low value is adjusted, the non-zero preselected high value is adjusted in proportion to the non-zero preselected low value.

12. The apparatus of claim 11 wherein the detection element divides the target region into a plurality of detection areas.

13. A laser-based coating removal system comprising:
   a. a surface having a coating; and
   b. a laser-based removal apparatus comprising:
      i. a laser source to provide a laser light for removing the coating from a target region of the surface;
      ii. a routing element coupled to the laser source and configured to direct the laser light onto a target region of the surface;
      iii. a detection element to detect the coating as the coating separates from the target region of the surface by inputting a signal received from the surface at the target region; and
      iv. a controller configured to adjust a current firing rate of the laser light based on the signal received from the surface at the target region, wherein the controller is able to adjust a length of a detection period of the detection element based on one or more characteristics of the surface in the target region.

14. The system of claim 13 wherein the signal comprises data indicating one or more properties selected from the group consisting of the incandescence, acoustic signature, motion, fluorescence and chemical properties.

15. The system of claim 14 wherein the routing element receives the signal from the surface and transmits the signal to the detection element such that the detection element is able to detect if the coating has separated from the surface.

16. The system of claim 13 wherein an amount of energy per second directed onto the surface by the laser light is adjusted from a first non-zero amount to a second non-zero amount different than the first non-zero amount based on whether the detection element detects that the coating has separated from the surface in the target region.

17. The system of claim 13 wherein if the detection element does not detect the coating separating from the target region for the detection period, the controller coupled to the detection element decreases the rate at which the laser light is directed onto the target region to a non-zero preselected low value.

18. The system of claim 17 wherein the controller is able to adjust the level of the non-zero preselected low value based on the one or more properties of the surface in the target region.

19. The system of claim 18 wherein if the detection element detects the coating has not yet separated from the surface in the target region for a duration while the amount of energy per second directed onto the target region by the laser light is equal to the non-zero preselected low value, the controller increases the amount of energy per second directed onto the target region by the laser light to the non-zero preselected high value.

20. The system of claim 19 wherein the controller is able to adjust the level of the non-zero preselected high value based on the one or more properties of the surface in the target region.

21. The system of claim 20 wherein the one or more properties of the surface in the target region comprise a temperature of the surface in the target region.

22. The system of claim 21 wherein the non-zero preselected high value is equal to a maximum amount of energy per second produced when the laser light has a maximum intensity and frequency and the non-zero preselected low value is equal to a minimum amount of energy per second produced when the laser light has a non-zero minimum intensity and frequency.

23. The system of claim 22 wherein the non-zero preselected high value and the non-zero preselected low value are proportional to each other such that if the non-zero preselected high or value rate is adjusted, the non-zero preselected low value is adjusted in proportion to the non-zero preselected high value and if the non-zero preselected low value is adjusted, the non-zero preselected high value is adjusted in proportion to the non-zero preselected low value.

24. The system of claim 23 wherein the detection element divides the target region into a plurality of detection areas.

* * * * *